US012035435B2

(12) United States Patent
Zhou et al.

(10) Patent No.: US 12,035,435 B2
(45) Date of Patent: Jul. 9, 2024

(54) TWO DIFFERENT CONFIGURATIONS OF AN ALWAYS-ON SLIDE SWITCH APPLICABLE WITHIN AN ILLUMINATION DEVICE

(71) Applicant: SAVANT TECHNOLOGIES LLC, East Cleveland, OH (US)

(72) Inventors: Tianci Zhou, Shanghai (CN); Chengbin Liu, Shanghai (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 314 days.

(21) Appl. No.: 17/542,315

(22) Filed: Dec. 3, 2021

(65) Prior Publication Data

US 2022/0183124 A1 Jun. 9, 2022

(30) Foreign Application Priority Data

Dec. 4, 2020 (CN) ........................ 202022876300.X

(51) Int. Cl.

*H01H 15/24* (2006.01)
*F21V 23/04* (2006.01)
*H05B 45/44* (2020.01)
*F21Y 115/10* (2016.01)

(52) U.S. Cl.

CPC ............. *H05B 45/44* (2020.01); *F21V 23/04* (2013.01); *H01H 15/24* (2013.01); *F21Y 2115/10* (2016.08)

(58) Field of Classification Search

CPC .......... H01H 1/36; H01H 1/365; H05B 45/44; B60Q 3/82

See application file for complete search history.

(56) References Cited

U.S. PATENT DOCUMENTS 4,816,626 A * 3/1989 Valenzona ............. H01H 15/06 200/548
7,220,926 B2 * 5/2007 Mano ..................... H01H 15/06 200/16 D

FOREIGN PATENT DOCUMENTS

CN 101071689 A 11/2007
CN 201233828 Y 5/2009

* cited by examiner

*Primary Examiner* — Vanessa Girardi
(74) *Attorney, Agent, or Firm* — WOOD IP LLC

(57) ABSTRACT

The disclosure provides a multi-step shorting switch and an illumination device. The multi-step shorting switch includes a housing, wherein an upper surface or a side surface thereof is provided with an opening; a toggle device provided in the housing, wherein a top portion or a side surface, corresponding to the above opening, of the toggle device is provided with a toggle, the toggle passes through the opening, and a bottom portion of the toggle device is provided with a sliding contact member; and multiple contact terminals provided on a substrate, wherein the sliding contact member is configured to, in a sliding process caused by that the toggle is shifted, simultaneously contact at least two of the multiple contact terminals, to form multiple steps which are continuously in a turn-on status without a turn-off status. The multi-step shorting switch according to the disclosure solves problems in the related art that a switch circuit structure is complicated and a double-sided Printed Circuit Board (PCB) board is required, and has the beneficial effects that a structure is simple, and it may work with or without a single-sided PCB board.

7 Claims, 5 Drawing Sheets

(b)

(b)

TWO DIFFERENT CONFIGURATIONS OF AN ALWAYS-ON SLIDE SWITCH APPLICABLE WITHIN AN ILLUMINATION DEVICE

TECHNICAL FIELD

The disclosure relates to the electrical field, and in particular to a multi-step shorting switch and an illumination device.

BACKGROUND

A shorting switch is a commonly used switch device for starting a control signal, which is widely applied in control devices of electronic products such as an illumination device, an audio device, a telephone, a communication device, an anti-theft device and an electronic toy. While the shorting switch is in step switching, a phenomenon of momentary short circuit or non-short circuit may occur between neighboring contact terminals.

A Light Emitting Diode (LED) illumination device, such as an LED type-A tube (three color temperature switchable product), requires a shorting switch to control two series of LEDs, such as a series of 4000K LEDs and a series of 6500K LEDs, so as to obtain a color temperature of 5000K.

For Type A Tube, ballast can create an extremely high voltage when no load that switch works at a non-shorting status. This status may happen when slider of switch is travelling and/or keeping still. The high voltage may damage LEDs and/or some other components instantly when switch move to an electrical connection status.

In order to avoid the above status of no load, in the related prior, a three-step shorting switch with 8 contact terminals (pins) and a double-sided Printed Circuit Board (PCB) board are soldered together. However, by adopting such a structure, due to too many contact terminals, the PCB board must be double-sided, and a circuit structure is complicated.

SUMMARY

The disclosure provides a multi-step shorting switch to solve problems in the related art that a switch circuit structure is complicated and a double-sided PCB board is required.

According to one aspect of the disclosure, a multi-step shorting switch is provided, including: a housing 1, wherein an upper surface or a side surface thereof is provided with an opening 111; a toggle device 2 provided in the housing 1, wherein a top portion or a side surface, corresponding to the above opening, of the toggle device 2 is provided with a toggle 21, the toggle 21 passes through the opening 111, and a bottom portion of the toggle device 2 is provided with a sliding contact member 27; and multiple contact terminals 31 provided on a substrate 3, wherein the sliding contact member 27 is configured to, in a sliding process caused by that the toggle 21 is shifted, simultaneously contact at least two of the multiple contact terminals 31, to form multiple steps which are continuously located in a turn-on status without a turn-off status.

Through the above structure, a problem that momentary short circuit or non-short circuit may occur between the neighboring contact terminals so that a high voltage breaks down an electrical component while the shorting switch is in a step switching is solved.

In an exemplary implementation embodiment of the disclosure, the number of the multiple contact terminals 31 is three, and the multi-step shorting switch is a three-step shorting switch.

Through providing three contact terminals, the circuit structure is simple, and the double-sided PCB board is not required, it is achieved by only using or without using the single-sided PCB board.

In an exemplary implementation embodiment of the disclosure, the multiple contact terminals 31 are arranged in two parallel rows, wherein one row is formed by a first contact terminal 31-1 and a third contact terminal 31-3 interval-arranged in a straight line, wherein the other row is formed by a second contact terminal 31-2.

Through enabling the contact terminals to be arranged in two parallel rows, while the multi-step switch is toggled, the sliding contact member may always contact at least two contact terminals at the same time, so that the multi-step switch may not be located in a turn-off status, and a high voltage caused by momentary short circuit or non-short circuit is avoided.

In an exemplary implementation embodiment of the disclosure, a total length of the first contact terminal 31-1, the third contact terminal 31-3 and an interval between two parties may be equal to a length of the second contact terminal 31-2.

In an exemplary implementation embodiment of the disclosure, the interval between the first contact terminal 31-1 and the third contact terminal 31-3 is less than a diameter width of a contact surface, in contact with the contact terminals (31) in a sliding direction, of the sliding contact member 27.

Through the above structure, in the second step, the sliding contact member may simultaneously contact three contact terminals, thereby the three contact terminals are turned on.

In an exemplary implementation embodiment of the disclosure, the multi-step short circuit has a first step status in which the sliding contact member 27 simultaneously contacts the first contact terminal 31-1 and the second contact terminal 31-2 to form a loop; a second step status in which the sliding contact member 27 simultaneously contacts the first contact terminal 31-1, the second contact terminal 31-2 and the third contact terminal 31-3 to form a loop; and a third step status in which the sliding contact member 27 simultaneously contacts the third contact terminal 31-3 and the second contact terminal 31-2 to form a loop.

Through the above structure, the shorting switch may simultaneously contact two neighboring contact terminals while the step is switched, thereby a phenomenon of momentary short circuit or non-short circuit between the neighboring contact terminals is avoided.

In an exemplary implementation embodiment of the disclosure, the multiple contact terminals 31 include the first contact terminal 31-1, the second contact terminal 31-2 and the third contact terminal 31-3 which are interval-arranged in a straight line.

Through the above structure, while the multi-step switch is toggled, the sliding contact member may always contact at least two contact terminals at the same time, so that the multi-step switch may not be located in the turn-off status, and the high voltage caused by the momentary short circuit or the non-short circuit is avoided.

In an exemplary implementation embodiment of the disclosure, the sliding contact member 27 may include a first contact clip 271-1, a second contact clip 271-2 and a third contact clip 271-3 which respectively correspond to the first contact terminal 31-1, the second contact terminal 31-2 and the third contact terminal 31-3.

Through the above structure, the contact clips correspond to the contact terminals, so that the different contact terminals may be turned on while the contact clips contact the different contact terminals, thereby step switching is achieved.

In an exemplary implementation embodiment of the disclosure, an interval between the contact terminals 31 is less than a width of the contact clip 271 of the sliding contact member 27.

In an exemplary implementation embodiment of the disclosure, in the sliding process, while the third contact clip 271-3 contacts the second contact terminal 31-2 and the first contact clip 271-1 contacts the first contact terminal 31-1, a first step is formed; while the third contact clip 271-3 contacts the third contact terminal 31-3, the second contact clip 271-2 contacts the second contact terminal 31-2 and the first contact clip 271-1 contacts the first contact terminal 31-1, a second step is formed; and while the third contact clip 271-3 contacts the third contact terminal 31-3 and the first contact clip 271-1 contacts the second contact terminal 31-2, a third step is formed.

Through the above structure, while the multi-step switch is toggled, the sliding contact member may always contact at least two contact terminals at the same time, the problem that the momentary short circuit or the non-short circuit may occur between the neighboring contact terminals so that the high voltage breaks down the electrical component while the shorting switch is in step switching is solved.

In an exemplary implementation embodiment of the disclosure, the multi-step shorting switch is one of the following electrical connection modes: a plug-in form, a Surface Mounted Technology (SMT) mode or a self-contained connection wire mode.

According to one aspect of the disclosure, an illumination device is provided including the above multi-step shorting switch.

Through providing the multi-step shorting switch in the illumination device, a color temperature of the illumination device may be controlled by the multi-step short circuit in an embodiment of the present application, thereby a problem in the related art that the momentary short circuit or the non-short circuit may occur between the neighboring contact terminals so that the high voltage breaks down the illumination device while the shorting switch is in step switching is avoided.

In an exemplary implementation embodiment of the disclosure, the illumination device further includes two series of LEDs, wherein the multi-step shorting switch is configured to: in the first step, turn on the first series of the LEDs; in the second step, turn on the first series of the LEDs and the second series of the LEDs; and in the third step, turn on the second series of the LEDs.

In the related art, for a type-A tube using the LED, while the switch works at no-load in a non-short circuit status, a ballast may generate an extremely high voltage. While the switch is shifted to an electrical connection status, a situation that the LEDs or some other components may be immediately damaged by the high voltage occurs. Through the above structure, while color temperature mixing and color temperature control of the LEDs are achieved, the breakdown of components in the type-A tube due to a momentary high voltage may also be avoided.

BRIEF DESCRIPTION OF THE DRAWINGS

Drawings of the description for constituting a part of the present application are used to provide further understanding of the disclosure, schematic implementation embodiments of the disclosure and descriptions thereof are used to explain the disclosure, and do not constitute improper limitation to the disclosure. In the drawings.

DETAILED DESCRIPTION OF THE EMBODIMENTS

In order to make those skilled in the art better understand schemes of the disclosure, the technical schemes in implementation embodiments of the disclosure are clearly and completely described below in combination with drawings in the implementation embodiments of the disclosure. Apparently, the implementation embodiments described are only a part of the implementation embodiments of the disclosure, and not all of the implementation embodiments. Based on the implementation embodiments in the disclosure, all other implementation embodiments obtained by those of ordinary skill in the art without creative work shall fall within a scope of protection of the disclosure.

It is to be noted that terms "first", "second" and the like in the description and claims of the disclosure and the above drawings are used to distinguish similar objects, and are not necessarily used to describe a specific sequence or a precedence order. It should be understood that data used in this way may be interchanged under appropriate circumstances, so that the implementation embodiments of the disclosure described here may be implemented in a sequence other than those illustrated or described here. In addition, terms "including" and "having" and any variations of them are intended to cover non-exclusive inclusions, for example, a process, a method, a system, a product or a device that includes a series of operations or modules or units is not necessarily limited to those operations or modules or units listed clearly, and may include other operations or modules or units that are not clearly listed or are inherent to these process, method, product or device.

Figure 1:
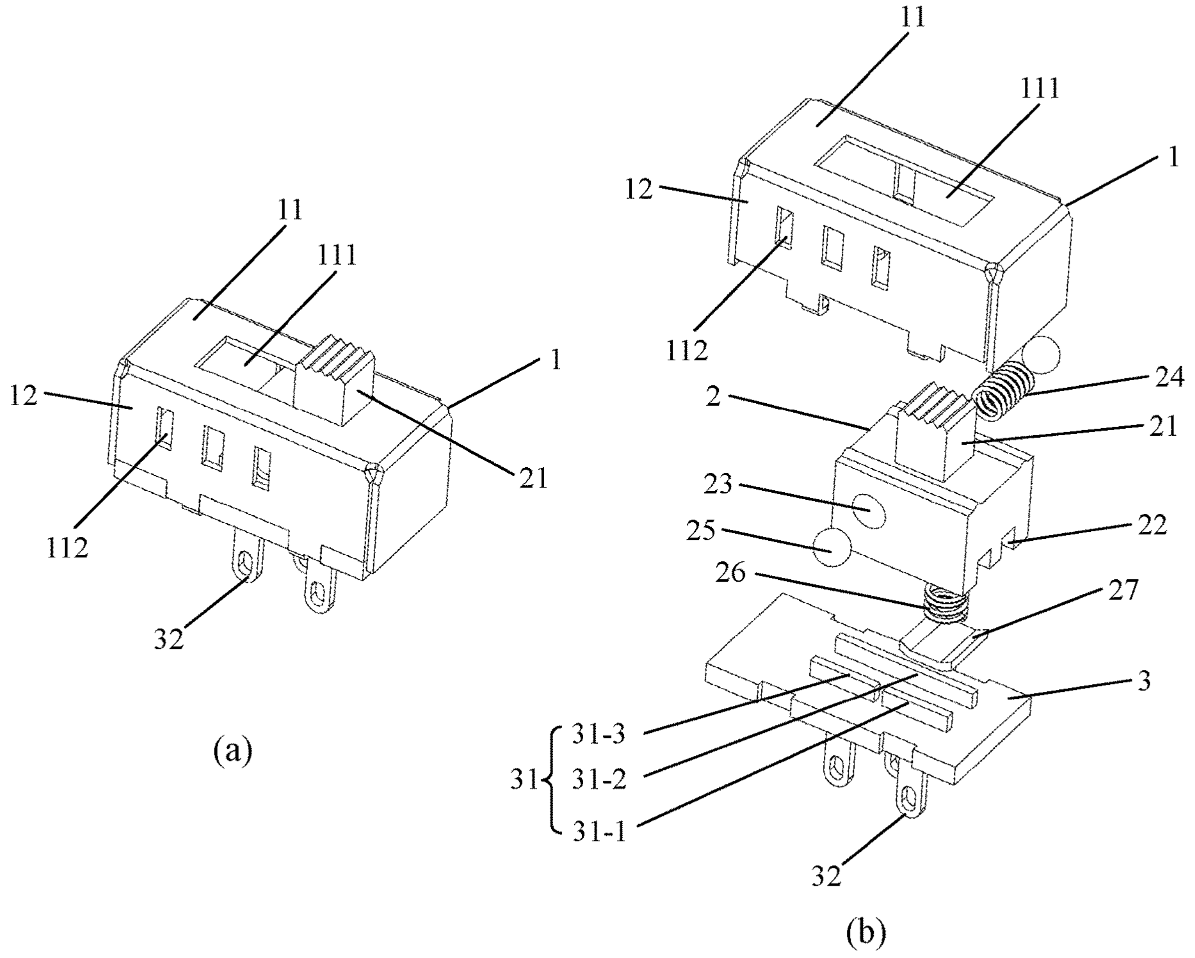
FIG. 1 shows a structure schematic diagram of a three-step shorting switch in accordance with an implementation embodiment of the disclosure.

FIG. 1 shows a structure schematic diagram of a three-step shorting switch in accordance with an implementation embodiment of the disclosure, herein, (a) in FIG. 1 is a structure schematic diagram of each forming component of the three-step shorting switch provided together, and (b) in FIG. 1 is a structure schematic diagram of each separated component of the three-step shorting switch.

As shown in FIG. 1, the three-step shorting switch includes a housing 1, a toggle device 2 and substrate 3.

The housing 1 is a hollowed cuboid shape, and includes an upper cover 11 and front, rear, left and right four side plates 12. A top portion of the upper cover 11 is provided with an opening 111, and one side plate 12 of the front and rear two side plates is provided with a step hole 112 corresponding to a switch step.

The toggle device 2 is provided in the housing 1, a top end thereof is provided with a toggle 21 protruded from the opening 111 at the top of the upper cover 11, and a bottom portion is provided with two installing grooves 22. A main body of the toggle device 2 is provided with a through hole 23 crosswise passing through the main body of the toggle device 2. The toggle device 2 further includes a stepping device. The stepping device includes a first spring 24, and two steel balls 25. The first spring 24 is provided in the through hole 23, and two ends thereof are provided with the steel balls 25, the steel balls 25 press the step holes 112 of the front and rear two side plates 12 through the first spring 24, thereby steps corresponding to the step holes 112 may be formed in a sliding process, for example, a first step, a second step and a third step. In other embodiments of the present disclosure, a side surface of the housing may also be provided with an opening, and a side surface, corresponding to the above opening, of the toggle device is provided with a toggle.

An upper surface of the substrate 3 is provided with multiple contact terminals 31 including a first contact terminal 31-1, a second contact terminal 31-2 and a third contact terminal 31-3. Herein, the first contact terminal 31-1 and the third contact terminal 31-3 are arranged in one row, the second contact terminal 31-2 and the first contact terminal 31-1 and the third contact terminal 31-3 which are arranged in one row are arranged in parallel. Specifically, two rows of the contact terminals are inserted on the substrate 3 in parallel, wherein one row of the contact terminals is formed by the first contact terminal 31-1 and the third contact terminal 31-3 interval-arranged in a straight line, and the other row of the contact terminals is formed by the second contact terminal 31-2 individually. The step holes 112 form a first step hole, a second step hole and a third step hole in interval along a straight line.

In an embodiment, a total length of the first contact terminal 31-1, the third contact terminal 31-3 and an interval between two parties is approximately equal to a length of the second contact terminal 31-2. The linear interval between the first contact terminal 31-1 and the third contact terminal 31-3 is less than a diameter width of a contact surface, in contact with the contact terminals (31) in a sliding direction, of the sliding contact member 27.

A lower portion of the toggle 21 of the toggle device 2 is provided with a spring cavity, and the spring cavity is internally provided with a second spring 26. An upper end of the second spring 26 is abutted to a top portion of the spring cavity, and a lower end of the second spring 26 is pressed against the sliding contact member 27. While the toggle 21 is shifted, the sliding contact member 27 is slid along two rows of the contact terminals. The steel balls 25 may be respectively embedded in the first step hole, the second step hole and the third step hole along with shifting of the toggle 21. While the steel ball 25 is embedded in the first step hole, the sliding contact member 27 respectively contacts the first contact terminal 31-1 and the second contact terminal 31-2; while the steel ball 25 is embedded in the second step hole, the sliding contact member 27 respectively contacts the first contact terminal 31-1, the second contact terminal 31-2 and the third contact terminal 31-3; and while the steel ball 25 is embedded in the third step hole, the sliding contact member 27 respectively contacts the second contact terminal 31-2 and the third contact terminal 31-3. By adopting the above structure, one row of the contact terminals of the substrate 3 is formed by the contact terminal 31-1 and the contact terminal 31-3 interval-arranged in a straight line, and the other row of the contact terminals is formed by the contact terminal 31-2 arranged in a straight line. Through such a non-symmetrical contact terminal parallel arrangement mode, the steel balls 25 are cooperated to respectively enter the first step hole, the second step hole and the third step hole, three steps that are always in a turn-on status but switchable may be formed. In other words, in a first step status, the sliding contact member 27 simultaneously contacts the first contact terminal 31-1 and the second contact terminal 31-2 to form a loop; in a second step status, the sliding contact member 27 simultaneously contacts the first contact terminal 31-1, the second contact terminal 31-2 and the third contact terminal 31-3 to form a loop; and in a third step status, the sliding contact member 27 simultaneously contacts the third contact terminal 31-3 and the second contact terminal 31-2 to form a loop.

Compared with the related art, the shorting switch provided by the disclosure is simpler in structure, and more accurate in function.

Figure 2:
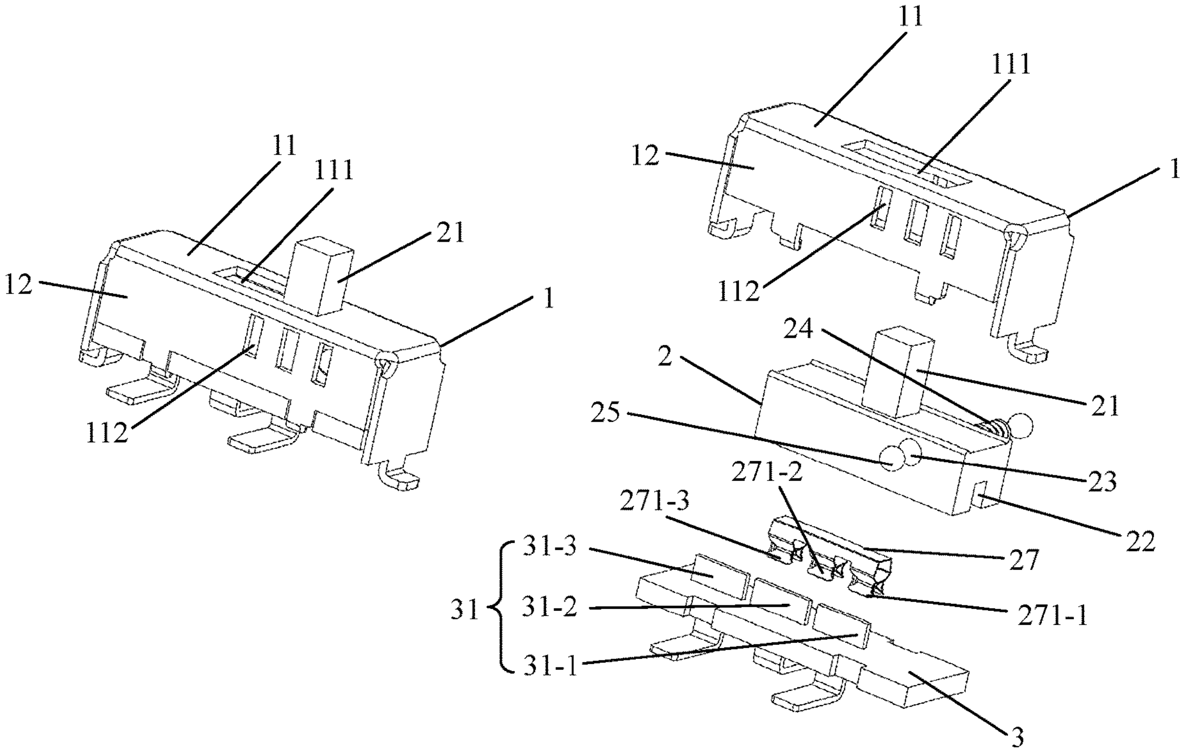
FIG. 2 shows another structure schematic diagram of the three-step shorting switch in accordance with an implementation embodiment of the disclosure.

FIG. 2 shows another structure schematic diagram of the three-step shorting switch in accordance with an implementation embodiment of the disclosure, wherein, (a) in FIG. 2 is a structure schematic diagram of each forming component of the three-step shorting switch provided together, and (b) in FIG. 2 is a structure schematic diagram of each separated component of the three-step shorting switch.

As shown in FIG. 2, the three-step shorting switch includes a housing 1, a toggle device 2 and a substrate 3. Herein, the housing 1 includes an upper cover 11 and front, rear, left and right four side plates 12. A top portion of the upper cover 11 is provided with an opening 111, the front and rear side plates 12 are provided with step holes 112 corresponding to switch steps. An upper surface of the substrate 3 is provided with three contact terminals 31, and a bottom portion is provided with pins.

The toggle device 2 is provided in the housing 1, a top end of the toggle device 2 is provided with a toggle 21 protruded from the opening 111 at the top of the upper cover 11, a bottom portion of the toggle device 2 is provided with an installing groove 22, and a top portion of the toggle device 2 is provided with a through hole 23 crosswise passing through the toggle device 2. The toggle device 2 further includes a stepping device. The stepping device includes a first spring 24, and two steel balls 25. The first spring 24 is provided in the through hole 23, and two ends thereof are provided with the steel balls 25, the steel balls 25 press the step holes 112 of the front and rear side plates 12 through the first spring 24.

The sliding contact member 27 is provided in the installing groove 22 of the toggle device 2, and may be slid by shifting of the toggle 21. A bottom portion of the sliding contact member 27 is provided with contact clips 271 which may clip multiple contact terminals 31 on the upper surface of the substrate 3 so as to turn on the contact terminals 31. The contact clips 271 includes a first contact clip 271-1, a second contact clip 271-2 and a third contact clip 271-3 which respectively correspond to a first contact terminal 31-1, a second contact terminal 31-2 and a third contact terminal 31-3.

The multiple contact terminals 31 include the first contact terminal 31-1, the second contact terminal 31-2 and the third contact terminal 31-3 which are successively arranged in one row.

In a sliding process, in a case that the third contact clip 271-3 contacts the second contact terminal 31-2 and the first contact clip 271-1 contacts the first contact terminal 31-1, a first step is formed; in a case that the third contact clip 271-3 contacts the third contact terminal 31-3, the second contact clip 271-2 contacts the second contact terminal 31-2 and the first contact clip 271-1 contacts the first contact terminal 31-1, a second step is formed; and in a case that the third contact clip 271-3 contacts the third contact terminal 31-3 and the first contact clip 271-1 contacts the second contact terminal 31-2, a third step is formed. Herein, an interval between the contact terminals 31 is less than a width of the contact clip 271 of the sliding contact member 27.

In the present disclosure, the multi-step shorting switch may be one of the following electrical connection modes: a plug-in mode, an SMT mode or a self-contained connection wire mode.

Figure 3:
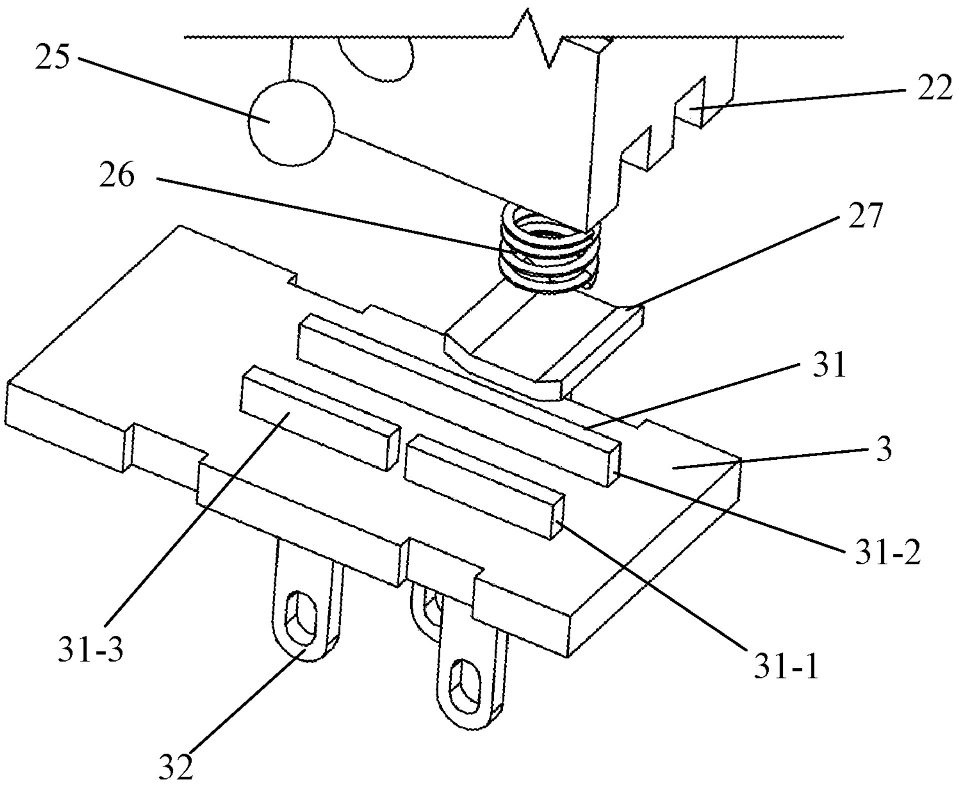
FIG. 3 shows a connection schematic diagram of contact terminals of the three-step shorting switch shown in FIG. 1 in accordance with an implementation embodiment of the disclosure.

FIG. 3 shows a connection schematic diagram of contact terminals of the three-step shorting switch shown in FIG. 1 in accordance with an implementation embodiment of the disclosure. As shown in FIG. 3, while the toggle is shifted, the sliding contact member 27 simultaneously contacts the first contact terminal 31-1 and the second contact terminal 31-2, at this moment, the steel ball is locked in the first step hole. While the toggle is further shifted, the sliding contact member 27 simultaneously contacts the first contact terminal 31-1, the second contact terminal 31-2 and the third contact terminal 31-3, at this moment, the steel ball is locked in the second step hole. After that, while the toggle is shifted to a step corresponding to the third step hole, the sliding contact member 27 simultaneously contacts the second contact terminal 31-2 and the third contact terminal 31-3.

Figure 4:
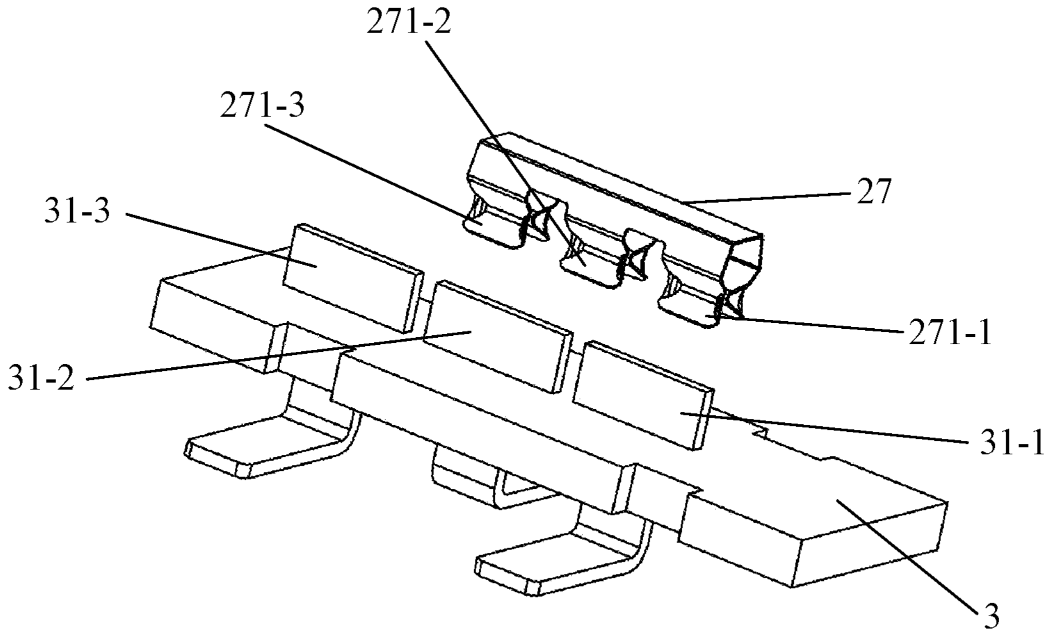
FIG. 4 shows a connection schematic diagram of contact terminals of the three-step shorting switch shown in FIG. 2 in accordance with an implementation embodiment of the disclosure.

FIG. 4 shows a connection schematic diagram of contact terminals of the three-step shorting switch shown in FIG. 2 in accordance with an implementation embodiment of the disclosure. As shown in FIG. 4 and FIG. 2, while the toggle 21 is shifted, the steel ball 25 is locked in the first step hole, at this moment, the third contact clip 271-3 contacts the second contact terminal 31-2, the first contact clip 271-1 contacts the first contact terminal 31-1, and the multi-step switch is stepped in the first step. While the toggle 21 is further shifted, the steel ball 25 is locked in the second step hole, at this moment, the third contact clip 271-3 contacts the third contact terminal 31-3, the second contact clip 271-2 contacts the second contact terminal 31-2, the first contact clip 271-1 contacts the first contact terminal 31-1, and the switch is stepped in the second step. After that, while the steel ball 25 is locked in the third step hole, the third contact clip 271-3 contacts the third contact terminal 31-3, the first contact clip 271-1 contacts the second contact terminal 31-2, and the switch is stepped in the third step.

In the prior art, the multi-step switch has a turn-on status and a turn-off status, it may occur that an electrical component may be immediately damaged by a high voltage while the switch is shifted to an electrical connection status. However, the present application is capable of, through the above structure, enabling the switch to be always located in the turn-on status without the turn-off status, namely the switch works at all times, thereby a problem that the electrical component is damaged by the high voltage is avoided, and it has a beneficial effect that an electronic device is safer.

In addition, in the prior art, because there are eight contact terminals usually, the PCB substrate must be double-sided. Through the above structure, because only three contact terminals are provided, the structure is simple, and it is possible that the three contact terminals are provided on one surface of the PCB board, or the switch is provided with a wire by itself without the PCB board.

An implementation embodiment of the disclosure further provides an LED illumination device with a three-step shorting switch.

Color temperatures of light sources of the LED illumination device are different, and light colors are also different. Usually, the LED illumination device needs to provide a plurality of the color temperatures for a user to choose. The color temperature is below 3000K, the light color is reddish to give a warming feeling, there is a stable atmosphere, and the warming feeling is called as a warm color temperature. While the color temperature is between 3000 and 6000K, people have no particularly apparent visual psychological effects in this hue, and there is a refreshing feeling, so it is called as a neutral color temperature. The color temperature exceeds 6000K, and the light color is bluish to give the people a cool feeling, it is called as a cool color temperature.

In order to provide the different color temperatures for the user to choose, the LED illumination device in an embodiment of the present application is provided with the shorting switch, so that it may switch between several different LED series and mix the color temperatures, and provide different color temperature options for a customer. At the same time, because the shorting switch is provided, the possibility that the high voltage breaks down other components of the LED illumination device is avoided.

In the present exemplary embodiment, the LED illumination device, for example, an LED type-A tube (three color temperature switchable product), includes the shorting switch as mentioned above and two series of LEDs. Herein, the two series of the LEDs, such as a series of 4000K LEDs and a series of 6500K LEDs, are controlled by the shorting switch, to obtain a colorful mixed color temperature (CCT), such as 5000K.

Figure 5A:
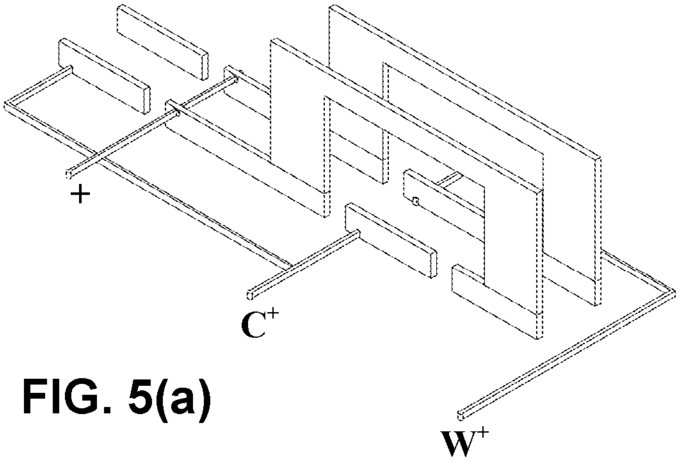
Prior Art FIG. 5(a)
FIGS. 5(*a*)-5(*c*) show a schematic diagram of a connection relation between the three-step shorting switch and LEDs in accordance with the related art.
Figure 5B:
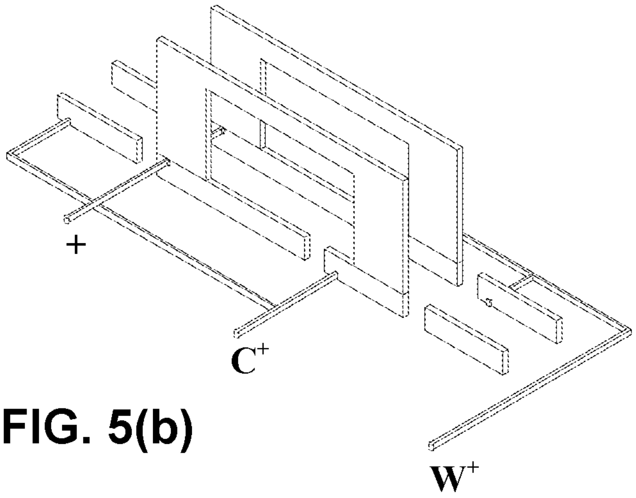
Prior Art FIG. 5(b)
Figure 5C:
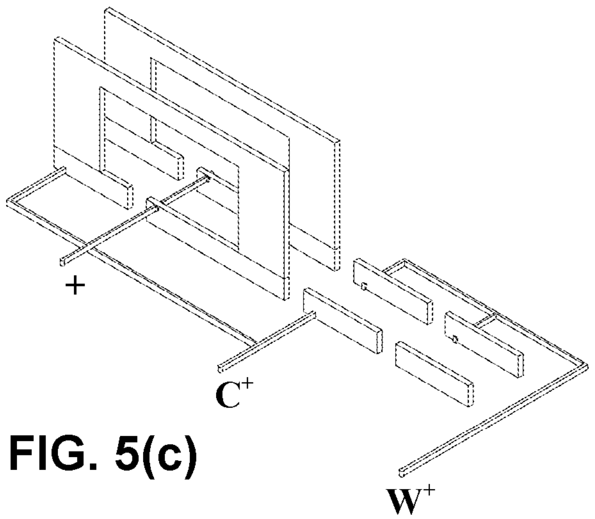
Prior Art FIG. 5(c)

FIG. 5 shows a schematic diagram of a connection relation between the three-step shorting switch and LEDs in accordance with the related art. As shown in (a) of FIG. 5, in the first step of the third-step shorting switch, the third-step shorting switch enables a positive electrode (+) and a Warmwhite color temperature ($W^+$) to be connected; as shown in (b) of FIG. 5, in the second step, the positive electrode (+), a Coolwhite color temperature ($C^+$) and the Warmwhite color temperature are enabled to be connected; and as shown in (c) of FIG. 5, in the third step, the positive electrode (+) and the Coolwhite color temperature ($C^+$) are enabled to be connected.

Through step switching of the third-step shorting switch, the two series of the LEDs are turned on in a combined form, so as to achieve a purpose of switching and mixing the color temperatures.

In addition, for a type-A tube, while the switch works at no-load in a non-short circuit status, a ballast may generate an extremely high voltage. While the switch is shifted to an electrical connection status, a situation that the LEDs or some other components may be immediately damaged by the high voltage occurs. In the prior art, in order to solve the no-load problem, one three-step shorting switch with 8 contact terminals and one double-sided PCB board are soldered together. However, by adopting such a structure, due to too many contact terminals, the PCB board must be double-sided, and the circuit structure is complicated. However, in an embodiment provided by the disclosure, only three contact terminals are used, so that a single-sided PCB board or switch contact terminals with its own wires without the PCB board may meet requirements, and the circuit structure is simple, the convenience of operations is improved.

In the above implementation embodiments of the disclosure, the description of each implementation embodiment has its own focus, and a part which is not described in detail in a certain implementation embodiment may refer to related descriptions of other implementation embodiments.

In a plurality of the implementation embodiments provided by the disclosure, it should be understood that the technical content disclosed may be achieved by other ways. Herein, the device implementation embodiments described above are only illustrative, for example, the division of the units or modules is only a logical function division, there may be other division modes in actual implementation, for example, multiple units or modules or components may be combined or integrated to another system, or some features may be ignored, or not executed. In addition, mutual coupling or direct coupling or communication connection displayed or discussed may be indirect coupling or the communication connection through some interfaces, modules or units, and may be electrical or other forms.

The units or modules described as separate components may or may not be separated physically, the components displayed as the units or the modules may or may not be physical units or modules, namely they may be located in one place, or may also be distributed to multiple network units or modules. Some or all of the units or the modules may be selected to achieve a purpose of a scheme of the present implementation embodiment according to actual needs.

In addition, each function unit or module in each implementation embodiment of the disclosure may be integrated in one processing unit or module, or each unit or module may exist alone physically, or two or more than two units or modules may be integrated in one unit or module. The above integrated units or modules may be achieved by using a form of hardware, or may be achieved by using a form of a software function unit or module.

If the integrated unit is achieved in the form of the software function unit and sold or used as an independent product, it may be stored in a computer readable storage medium. Based on such understanding, a technical scheme of the disclosure or a part making a contribution to the related art or all or part of the technical scheme may be embodied essentially in the form of a software product, the computer software product is stored in a storage medium, and includes a plurality of instructions which are used to enable a computer device (may be a personal computer, a server or a network device and the like) to execute all or part of operations of the method in each implementation embodiment of the disclosure. The above storage medium includes various mediums which may store program codes, such as a USB disk, a Read-Only Memory (ROM), a Random Access Memory (RAM), a mobile hard disk, a magnetic disk or an optical disk.

The above are only preferred embodiments of the disclosure, it should be noted that a plurality of improvements and modifications may also be made by those of ordinary skill in the art under a precondition without departing from principles of the disclosure, these improvements and modifications should also be regarded as a scope of protection of the disclosure.

What is claimed is:

1. A multi-step shorting switch, comprising:

a housing, wherein an upper surface or a side surface thereof is provided with an opening;

a toggle device provided in the housing, wherein a top portion or a side surface, corresponding to the opening, of the toggle device is provided with a toggle, the toggle passes through the opening, and a portion of the toggle device is provided with a sliding contact member; and three contact terminals provided on a substrate, wherein the multi-step shorting switch is configured to have three steps by having the sliding contact member configured to, in a sliding process caused by that the toggle is shifted, simultaneously contact two or all three of the contact terminals, to form the three steps which are continuously in a turn-on status without a turn-off status, wherein the three contact terminals comprise a first contact terminal, a second contact terminal and a third contact terminal which are interval-arranged in a straight line, and the sliding contact member comprises a first contact clip, a second contact clip and a third contact clip which respectively correspond to the first contact terminal, the second contact terminal and the third contact terminal.

2. The multi-step shorting switch as claimed in claim 1, wherein the multi-step shorting switch has a first step status in which the sliding contact member simultaneously contacts the first contact terminal and the second contact terminal to form a loop; a second step status in which the sliding contact member simultaneously contacts the first contact terminal, the second contact terminal and the third contact terminal to form a loop; and a third step status in which the sliding contact member simultaneously contacts the third contact terminal and the second contact terminal to form a loop.

3. The multi-step shorting switch as claimed in claim 1, wherein an interval between each contact terminal is less than a width of each contact clip corresponding thereto of the sliding contact member.

4. The multi-step shorting switch as claimed in claim 1, wherein in the sliding process, in a case that the third contact clip contacts the second contact terminal and the first contact clip contacts the first contact terminal, a first step is formed; in a case that the third contact clip contacts the third contact terminal, the second contact clip contacts the second contact terminal and the first contact clip contacts the first contact terminal, a second step is formed; and in a case that the third contact clip contacts the third contact terminal and the first contact clip contacts the second contact terminal, a third step is formed.

5. The multi-step shorting switch as claimed in claim 1, wherein the multi-step shorting switch is in one of the following electrical connection modes: a plug-in mode, a surface mounted Technology, SMD, mode or a self-contained connection wire mode.

6. An illumination device, comprising the multi-step shorting switch as claimed in claim 1.

7. The illumination device as claimed in claim 6, further comprising a first series and a second series of LEDs, wherein the multi-step shorting switch is configured to: in the first step, turn on the first series of the LEDs; in the second step, turn on the first series of the LEDs and the second series of the LEDs; and in the third step, turn on the second series of the LEDs.

* * * * *